United States Patent
Matoba et al.

[11] Patent Number: 6,058,005
[45] Date of Patent: May 2, 2000

[54] DIELECTRIC CERAMIC COMPOSITION AND MONOLITHIC CERAMIC CAPACITOR USING THE COMPOSITION

[75] Inventors: Hiroaki Matoba, Moriyama; Harunobu Sano, Kyoto, both of Japan

[73] Assignee: Murata Manufacturing Co., Ltd., Japan

[21] Appl. No.: 09/141,657

[22] Filed: Aug. 28, 1998

[30] Foreign Application Priority Data

Sep. 25, 1997 [JP] Japan .................................. 9-260150

[51] Int. Cl.[7] ........................... H01G 4/06; H01G 4/12; C04B 35/00
[52] U.S. Cl. ........................... 361/321.4; 361/321.5; 361/320; 361/303; 501/139
[58] Field of Search ................ 361/311–313, 321.1, 361/321.2, 321.3, 321.4, 321.5, 322, 320; 501/134–136, 137, 139

[56] References Cited

U.S. PATENT DOCUMENTS

| | | | |
|---|---|---|---|
| 4,548,910 | 10/1985 | Irisawa | 501/137 |
| 4,739,544 | 4/1988 | Okazaki et al. | 29/25.42 |
| 5,204,301 | 4/1993 | Ohkubo et al. | 501/136 |
| 5,244,851 | 9/1993 | Takahashi et al. | 501/139 |
| 5,292,694 | 3/1994 | Abe et al. | 501/139 |
| 5,356,844 | 10/1994 | Hirahara et al. | 501/136 |
| 5,688,732 | 11/1997 | Park et al. | 501/138 |
| 5,916,834 | 6/1999 | Terahi et al. | 501/138 |

*Primary Examiner*—Kristine Kincaid
*Assistant Examiner*—Eric Thomas
*Attorney, Agent, or Firm*—Ostrolenk, Faber, Gerb & Soffen, LLP

[57] ABSTRACT

Disclosed is a dielectric ceramic composition containing an essential component represented by the formula, $xBaO-yTiO_2-zRe_2O_3$, wherein x, y and z are in mol %; $x+y+z=100$; and (x, y, z) falls within a polygonal region defined by four points of A (39.5, 59.5, 1), B (1, 59.5, 39.5), C (1, 85, 14) and D (14, 85, 1), and further containing V, Cu and Mn as side components in an amount of about 0.1 wt. % to 15 wt. % in terms of $V_2O_5$, in an amount not greater than 10 wt. % in terms of CuO, and in an amount not greater than 1 wt. % in terms of MnO, respectively, relative to 100 wt. % of the essential component.

20 Claims, 3 Drawing Sheets

DIELECTRIC CERAMIC COMPOSITION AND MONOLITHIC CERAMIC CAPACITOR USING THE COMPOSITION

BACKGROUND OF THE INVENTION

1. Field of the Invention

The present invention relates to dielectric ceramic compositions, and particularly to dielectric ceramic compositions for use in monolithic ceramic capacitors having inner electrodes made essentially of silver-palladium (Ag-Pd).

2. Description of the Related Art

Ceramic capacitors for temperature compensation use have been used widely in tuning circuits, resonance circuits, etc. Since small-sized ceramic capacitors having a small dielectric loss and stable dielectric characteristics are preferred, dielectric ceramics for such capacitor applications desirably have a high specific inductive capacity and a small dielectric loss, i.e., a large Q value.

Monolithic ceramic capacitors using dielectric ceramic compositions having the above-mentioned characteristics have been put into practical use. However, since the firing temperature of dielectric ceramics is as high as 1300° C. to 1400° C., palladium, platinum or a like material having a high melting point must be used as a material for inner electrodes. One problem with these electrode materials is their high prices.

Ag-Pd is an electrode material less expensive than Pd and Pt. The melting point of Ag is 961° C. As the Ag content of an electrode material increases, the electrode material cost reduces; however, the firing temperature of a dielectric ceramic must be lowered accordingly. Specifically, there is demand for a dielectric ceramic composition that can be fired at a firing temperature up to about 1250° C.

SUMMARY OF THE INVENTION

An object of the present invention is to provide a dielectric ceramic composition having a high specific inductive capacity, $\epsilon r$, and a large Q value and which is capable of being sintered at low temperatures.

To achieve the above object, according to a first aspect of the present invention, there is provided a dielectric ceramic composition containing an essential component represented by the following formula:

$$xBaO-yTiO_2-zRe_2O_3$$

where x, y, and z are in mol %; x+y+z=100; (x, y, z) falls within a polygonal region defined by four points of A(39.5, 59.5, 1), B(1, 59.5, 39.5), C(1, 85, 14) and D(14, 85, 1); and Re is at least one rare earth element selected from the group consisting of Tb, Dy, Ho, Er and Yb, and further containing V as a side component in an amount, $\alpha$, of about 0.1 wt. % to 15 wt. % in terms of $V_2O_5$ relative to 100 wt. % of the essential component.

The dielectric ceramic composition according to the first aspect of the invention exhibits a specific inductive capacity, $\epsilon r$, of not lower than about 30 at room temperature, and a Q value of not lower than about 1000 at 1 MHz, and can be fired at a temperature of up to about 1250° C.

According to a second aspect of the present invention, there is provided a dielectric ceramic composition containing an essential component represented by the following formula:

$$xBaO-yTiO_2-z(ReI_aReII_{(1-a)})_2O_3$$

where x, y, and z are in mol %; x+y+z=100; (x, y, z) falls within a polygonal region defined by four points of A(39.5, 59.5, 1), B(1, 59.5, 39.5), C(1, 85, 14) and D(14, 85, 1); 0.2<a<1.0; ReI is at least one rare earth element selected from the group consisting of Tb, Dy, Ho, Er and Yb; and ReII is at least one rare earth element selected from the group consisting of La, Pr, Nd and Sm and further containing V as a side component in an amount, $\alpha$, of about 0.1 wt. % to 15 wt. % in terms of $V_2O_5$ relative to 100 wt. % of the essential component.

The dielectric ceramic composition according to the second aspect exhibits a specific inductive capacity, $\epsilon r$, of not lower than about 40 at room temperature, and a Q value of not lower than about 1000 at 1 MHz, and can be fired at a temperature of up to about 1250° C.

Preferably, in the dielectric ceramic compositions according to the first and/or second aspects of the invention, Cu is contained as a side component in an amount, $\beta$, of not greater than about 10 wt. % in terms of CuO relative to 100 wt. % of the essential component, so as to further lower the firing temperature.

Preferably, in the dielectric ceramic compositions according to the first and/or second aspects of the present invention, Mn is contained as a side component in an amount, $\gamma$, of not greater than about 1 wt. % in terms of MnO relative to 100 wt. % of the essential component, so as to further increase the Q value.

PREFERRED MODES FOR CARRYING OUT THE INVENTION

Figure 1:
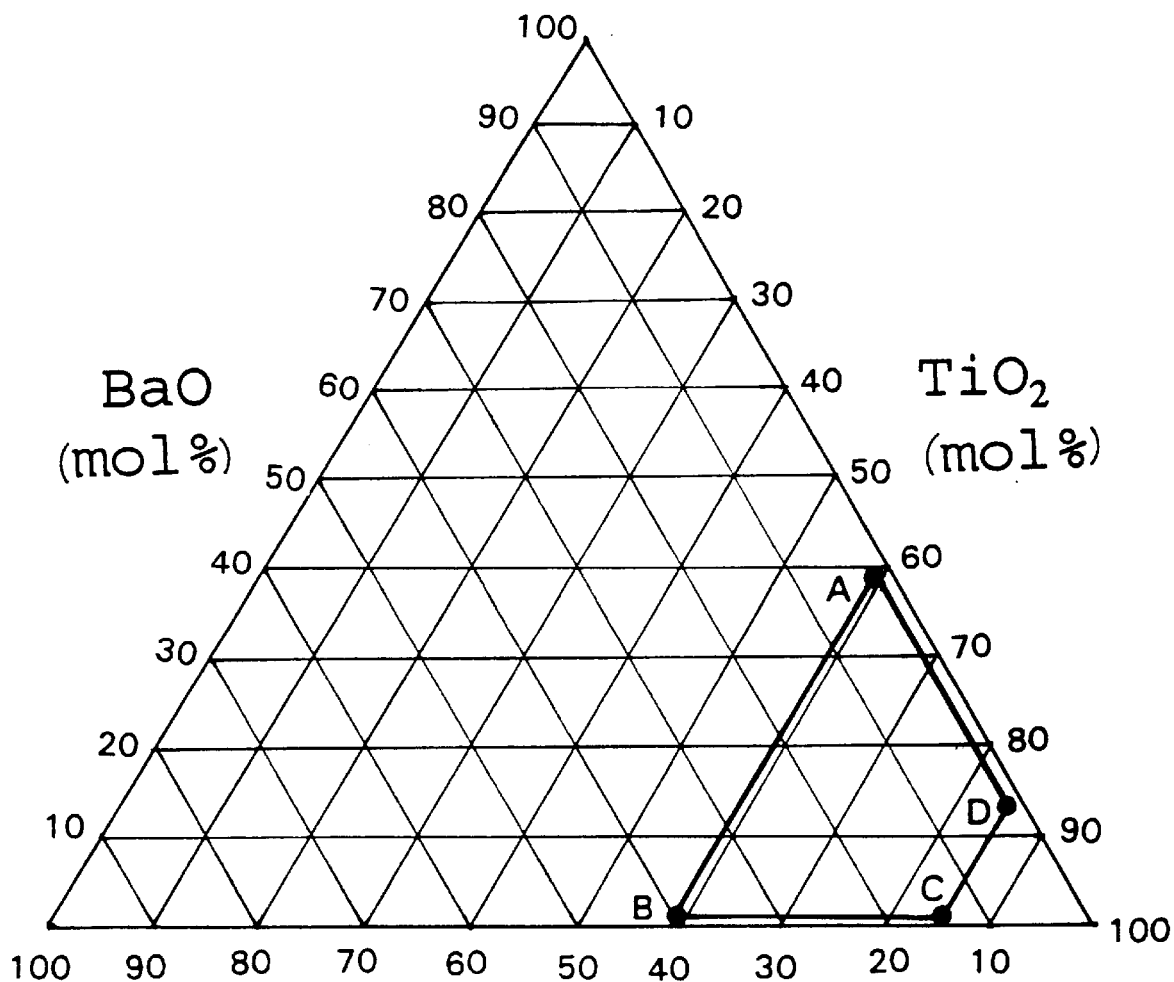
FIG. 1 is a ternary compositional diagram showing the compositional range of an essential component of a dielectric ceramic composition according to the present invention.

Embodiments of the present invention will now be described by way of example.

EXAMPLE 1

Barium carbonate ($BaCO_3$), titanium oxide ($TiO_2$), rare earth oxide ($Re_2O_3$) vanadium oxide ($V_2O_5$), copper oxide (CuO) and manganese carbonate ($MnCO_3$) were weighed so as to prepare dielectric ceramic compositions as shown in Table 1. Each composition was wet-milled with ethanol in a ball mill for 16 hours. The resultant mixture was dried and pulverized, followed by preliminary firing at 1000° C. to obtain a preliminary fired powder. An appropriate amount of polyvinyl alcohol solution was added to the powder and mixed. The mixture was sheeted through doctor blading to obtain a ceramic green sheet having a thickness of 50 $\mu$m. Thirteen thus-obtained ceramic green sheets were arranged in layers and hot-pressed to obtain a laminate. A disc having a diameter of 14 mm and a thickness of 0.5 mm was punched out from the laminate. The disc was treated at a temperature of 300° C. so as to burn out binder and was then fired at firing temperature shown in Table 1, obtaining a dielectric sample.

The thus-obtained dielectric sample was coated over the entire upper and lower surfaces thereof with indium-gallium (In-Ga) serving as an electrode to obtain a disc capacitor, which served as a sample for evaluation. The sample was measured for electrostatic capacity (Cap) and Q value at a frequency of 1 MHz and an input voltage of 1 Vrms. The sample was also measured for diameter (D) and thickness (T), and the specific inductive capacity of the sample was calculated based on the measured D and T values. The results are shown in Table 1.

TABLE 1

| Sample No. | BaO x | $TiO_2$ y | $Re_2O_3$ z | Re (mol %) Tb | Dy | Ho | Er | Yb | $V_2O_5$ α wt % | CuO β wt % | MnO γ wt % | Firing Temperature (° C.) | εr | Q (at 1 MHZ) |
|---|---|---|---|---|---|---|---|---|---|---|---|---|---|---|
| *1 | 39.5 | 59.5 | 1 | 0 | 0 | 0 | 80 | 20 | 0 | 0 | 0 | 1300 | 32 | 500 |
| *2 | 1 | 59.5 | 39.5 | 0 | 0 | 0 | 80 | 20 | 0 | 0 | 0 | 1350 | 30 | 800 |
| *3 | 1 | 85 | 14 | 0 | 0 | 0 | 80 | 20 | 0 | 0 | 0 | 1300 | 33 | 1000 |
| *4 | 14 | 85 | 1 | 0 | 0 | 0 | 80 | 20 | 0 | 0 | 0 | 1300 | 35 | 2000 |
| *5 | 30 | 65 | 5 | 5 | 10 | 10 | 75 | 0 | 0 | 0 | 0 | 1300 | 43 | 500 |
| *6 | 30 | 65 | 5 | 5 | 10 | 10 | 75 | 0 | 0 | 0 | 0 | 1150 | | Not sintered |
| *7 | 3 | 65 | 32 | 5 | 10 | 10 | 75 | 0 | 0 | 0 | 0 | 1350 | 41 | 2000 |
| *8 | 3 | 65 | 32 | 5 | 10 | 10 | 75 | 0 | 0 | 0 | 0 | 1190 | | Not sintered |
| *9 | 15 | 80 | 5 | 5 | 10 | 10 | 75 | 0 | 0 | 0 | 0 | 1300 | 53 | 2000 |
| *10 | 15 | 80 | 5 | 5 | 10 | 10 | 75 | 0 | 0 | 0 | 0 | 1150 | | Not sintered |
| *11 | 20 | 70 | 10 | 0 | 0 | 0 | 100 | 0 | 0 | 0 | 0 | 1300 | 69 | 10000 or more |
| *12 | 20 | 70 | 10 | 0 | 0 | 0 | 100 | 0 | 0 | 0 | 0 | 1150 | | Not sintered |
| *13 | 10 | 70 | 20 | 0 | 0 | 0 | 100 | 0 | 0 | 0 | 0 | 1300 | 58 | 10000 or more |
| *14 | 10 | 70 | 20 | 0 | 0 | 0 | 100 | 0 | 0 | 0 | 0 | 1150 | | Not sintered |
| *15 | 20 | 58 | 22 | 20 | 50 | 0 | 30 | 0 | 3 | 0 | 0 | 1150 | 23 | 500 |
| *16 | 0.5 | 74.5 | 25 | 20 | 50 | 0 | 30 | 0 | 3 | 0 | 0 | 1150 | 26 | 800 |
| *17 | 5 | 90 | 5 | 20 | 50 | 0 | 30 | 0 | 3 | 0 | 0 | 1150 | 20 | 700 |
| *18 | 35 | 64.5 | 0.5 | 20 | 50 | 0 | 30 | 0 | 3 | 0 | 0 | 1150 | 28 | 300 |
| 19 | 39.5 | 59.5 | 1 | 0 | 0 | 0 | 80 | 20 | 2 | 0 | 0 | 1150 | 35 | 1000 |
| 20 | 1 | 59.5 | 39.5 | 0 | 0 | 0 | 80 | 20 | 5 | 0 | 0 | 1190 | 31 | 1000 |
| 21 | 1 | 85 | 14 | 0 | 0 | 0 | 80 | 20 | 2 | 0 | 0 | 1150 | 33 | 2000 |
| 22 | 14 | 85 | 1 | 0 | 0 | 0 | 80 | 20 | 2 | 0 | 0 | 1150 | 36 | 3000 |
| 23 | 30 | 65 | 5 | 5 | 10 | 10 | 75 | 0 | 2 | 0 | 0.05 | 1150 | 44 | 2000 |
| 24 | 3 | 65 | 32 | 5 | 10 | 10 | 75 | 0 | 5 | 0 | 0.05 | 1190 | 43 | 3000 |
| 25 | 15 | 80 | 5 | 5 | 10 | 10 | 75 | 0 | 2 | 0 | 0.05 | 1150 | 55 | 3000 |
| 26 | 20 | 70 | 10 | 0 | 0 | 0 | 100 | 0 | 2 | 0 | 0 | 1150 | 63 | 10000 or more |
| 27 | 10 | 70 | 20 | 0 | 0 | 0 | 100 | 0 | 2 | 0 | 0 | 1150 | 58 | 10000 or more |
| 28 | 10 | 70 | 20 | 0 | 0 | 0 | 100 | 0 | 0.1 | 2 | 0 | 1250 | 58 | 1000 |
| 29 | 10 | 70 | 20 | 0 | 0 | 0 | 100 | 0 | 0.5 | 2 | 0 | 1250 | 58 | 2000 |
| 30 | 10 | 70 | 20 | 0 | 0 | 0 | 100 | 0 | 1 | 2 | 0 | 1200 | 57 | 4000 |
| 31 | 10 | 70 | 20 | 0 | 0 | 0 | 100 | 0 | 1 | 2 | 0.1 | 1190 | 57 | 4000 |
| 32 | 10 | 70 | 20 | 0 | 0 | 0 | 100 | 0 | 1 | 2 | 1 | 1170 | 56 | 5000 |
| *33 | 10 | 70 | 20 | 0 | 0 | 0 | 100 | 0 | 1 | 2 | 2 | 1170 | 50 | 2000 |
| 34 | 10 | 70 | 20 | 0 | 0 | 0 | 100 | 0 | 5 | 2 | 0.05 | 1130 | 57 | 7000 |
| 35 | 10 | 70 | 20 | 0 | 0 | 0 | 100 | 0 | 10 | 0 | 0.05 | 1100 | 58 | 8000 |
| 36 | 10 | 70 | 20 | 0 | 0 | 0 | 100 | 0 | 15 | 0 | 0.05 | 1100 | 51 | 8000 |
| *37 | 10 | 70 | 20 | 0 | 0 | 0 | 100 | 0 | 20 | 0 | 0.05 | 1100 | 49 | 2000 |
| 38 | 10 | 70 | 20 | 0 | 0 | 0 | 100 | 0 | 2 | 0.5 | 0.05 | 1120 | 58 | 10000 or more |
| 39 | 10 | 70 | 20 | 0 | 0 | 0 | 100 | 0 | 2 | 5 | 0.05 | 1080 | 54 | 9000 |
| 40 | 10 | 70 | 20 | 0 | 0 | 0 | 100 | 0 | 2 | 10 | 0.05 | 1050 | 50 | 8000 |
| *41 | 10 | 70 | 20 | 0 | 0 | 0 | 100 | 0 | 2 | 15 | 0.05 | 1050 | 49 | 2000 |
| 42 | 10 | 70 | 20 | 0 | 80 | 0 | 20 | 0 | 3 | 2 | 0.05 | 1100 | 54 | 10000 or more |
| 43 | 10 | 70 | 20 | 0 | 80 | 20 | 0 | 0 | 3 | 2 | 0.05 | 1100 | 57 | 10000 or more |
| 44 | 10 | 70 | 20 | 0 | 0 | 0 | 50 | 50 | 2 | 2 | 0.05 | 1100 | 51 | 10000 or more |
| 45 | 10 | 70 | 20 | 70 | 0 | 15 | 15 | 0 | 3 | 2 | 0.05 | 1100 | 58 | 10000 or more |
| 46 | 10 | 70 | 20 | 0 | 20 | 60 | 20 | 0 | 2 | 2 | 0.05 | 1100 | 53 | 10000 or more |
| 47 | 10 | 70 | 20 | 0 | 80 | 20 | 0 | 0 | 3 | 3 | 0.05 | 1080 | 52 | 10000 or more |
| 48 | 10 | 70 | 20 | 0 | 80 | 20 | 0 | 0 | 4 | 4 | 0.05 | 1070 | 51 | 10000 or more |
| 49 | 10 | 70 | 20 | 0 | 5 | 5 | 90 | 0 | 2 | 2 | 0.05 | 1100 | 50 | 10000 or more |
| 50 | 10 | 70 | 20 | 0 | 50 | 0 | 50 | 0 | 2 | 2 | 0.05 | 1100 | 55 | 10000 or more |

Sample Nos. marked with * indicate comparative examples which fall outside the scope of the invention.

FIG. 1 is a ternary composition diagram showing the compositional range of the essential component of the dielectric ceramic composition according to the first aspect of the present invention. The compositional range is limited to the polygonal region as defined by the points A, B, C and D. The reason for this limitation will be described below with reference to FIG. 1 and Table 1.

In an area outside the polygonal region as defined by the points A, B, C and D, the specific inductive capacity Er becomes lower than 30 and the Q value becomes smaller than 1000 at 1 MHz, which are unfavorable conditions in actual use.

If the V content is less than about 0.1 wt. % relative to 100 wt. % of the essential component, the dielectric ceramic composition fails to be sintered at a temperature of up to 1250° C., which is unfavorable. If the V content is in excess of about 15 wt. % relative to 100 wt. % of the essential component, the Q value decreases, which is unfavorable.

If the Cu content is in excess of about 10 wt. % relative to 100 wt. % of the essential component, the Q value decreases, which is unfavorable.

If the Mn content is in excess of about 1 wt. % relative to 100 wt. % of the essential component, the Q value decreases, which is unfavorable.

Sample Nos. 42 to 50 exhibit. Specifically, a Q value of 10000 or more, ∈r of 50 or more, and a firing temperature of 1100° C. or lower. Accordingly, preferably, (x, y, z) is (ca. 10, ca. 70, ca. 20), Re is at least one of Ho and Er, α is between about 2 and about 4, β is between about 2 and about 4, and γ is not greater than about 0.05.

EXAMPLE 2

$BaCO_3$, $TiO_2$, $Re_2O_3$, $V_2O_5$, CuO and $MnCO_3$ were weighed so as to prepare dielectric ceramic compositions as shown in Table 2. The compositions were sheeted in a manner similar to that of Example 1. Dielectric samples were obtained through sintering at corresponding sintering temperatures as shown in Table 2.

In a manner similar to that of Example 1, the dielectric samples were coated with In-Ga serving as electrodes, to thereby obtain samples. The samples were measured for electrostatic capacity (Cap) and Q value at a frequency of 1 MHz and an input voltage of 1 Vrms. The samples were also measured for diameter (D) and thickness (T), and the specific inductive capacities of the samples were calculated based on the measured D and T values. The results are shown in Table 2.

The compositional range of the essential component of the dielectric ceramic composition according to the second aspect of the present invention can also be represented by the ternary diagram of FIG. 1. The compositional range is limited to the polygonal region as defined by the points A, B, C and D. The reason for this limitation will be described below with reference to FIG. 1 and Table 2.

In an area outside the polygonal region as defined by the points A, B, C and D, the specific inductive capacity ∈r becomes lower than 40, or the Q value becomes smaller than 1000 at 1 MHz, which are unfavorable conditions in actual use.

If a is about 0.2 or about 1.0, the specific inductive capacity ∈r becomes lower than 40, or the Q value becomes smaller than 1000 at 1 MHz, which are unfavorable conditions in actual use.

If the V content is less than about 0.1 wt. % relative to 100 wt. % of the essential component, the dielectric ceramic composition fails to be sintered at a temperature up to 1250° C., which is unfavorable. If the V content is in excess of about 15 wt. % relative to 100 wt. % of the essential component, the Q value decreases, which is unfavorable.

If the Cu content is in excess of about 10 wt. % relative to 100 wt. % of the essential component, the Q value decreases, which is unfavorable.

TABLE 2

| Sample No. | BaO x | $TiO_2$ y | $Re_2O_3$ z | a | Re I (mol %) | | | | | Re II (mol %) | | | | $V_2O_5$ α wt % | CuO β wt % | MnO γ wt % | Firing Temperature (° C.) | ∈r | Q (at 1 MHZ) |
|---|---|---|---|---|---|---|---|---|---|---|---|---|---|---|---|---|---|---|---|
| | | | | | Tb | Dy | Ho | Er | Yb | La | Pr | Nd | Sm | | | | | | |
| *51 | 39.5 | 59.5 | 1 | 0.5 | 0 | 0 | 20 | 70 | 10 | 20 | 20 | 60 | 0 | 0 | 0 | 0 | 1320 | 39 | 800 |
| *52 | 1 | 59.5 | 39.5 | 0.5 | 0 | 0 | 20 | 70 | 10 | 20 | 20 | 60 | 0 | 0 | 0 | 0 | 1320 | 37 | 500 |
| *53 | 1 | 85 | 14 | 0.5 | 0 | 0 | 20 | 70 | 10 | 20 | 20 | 60 | 0 | 0 | 0 | 0 | 1320 | 41 | 1000 |
| *54 | 14 | 85 | 1 | 0.5 | 0 | 0 | 20 | 70 | 10 | 20 | 20 | 60 | 0 | 0 | 0 | 0 | 1320 | 42 | 1000 |
| *55 | 39.5 | 59.5 | 1 | 0.5 | 0 | 0 | 20 | 70 | 10 | 20 | 20 | 60 | 0 | 0 | 0 | 0 | 1250 | Not sintered. | |
| *56 | 1 | 59.5 | 39.5 | 0.5 | 0 | 0 | 20 | 70 | 10 | 20 | 20 | 60 | 0 | 0 | 0 | 0 | 1250 | Not sintered. | |
| *57 | 1 | 85 | 14 | 0.5 | 0 | 0 | 20 | 70 | 10 | 20 | 20 | 60 | 0 | 0 | 0 | 0 | 1250 | Not sintered. | |
| *58 | 14 | 85 | 1 | 0.5 | 0 | 0 | 20 | 70 | 10 | 20 | 20 | 60 | 0 | 0 | 0 | 0 | 1250 | Not sintered. | |
| 59 | 39.5 | 59.5 | 1 | 0.5 | 0 | 0 | 20 | 80 | 0 | 20 | 20 | 60 | 0 | 2 | 0 | 0 | 1180 | 41 | 1000 |
| 60 | 1 | 59.5 | 39.5 | 0.5 | 0 | 0 | 20 | 80 | 0 | 20 | 20 | 60 | 0 | 2 | 0 | 0 | 1180 | 43 | 1000 |
| 61 | 1 | 85 | 14 | 0.5 | 0 | 0 | 20 | 80 | 0 | 20 | 20 | 60 | 0 | 2 | 0 | 0 | 1180 | 40 | 2000 |
| 62 | 14 | 85 | 1 | 0.5 | 0 | 0 | 20 | 80 | 0 | 20 | 20 | 60 | 0 | 2 | 0 | 0 | 1180 | 44 | 2000 |
| 63 | 30 | 65 | 5 | 0.5 | 10 | 50 | 20 | 20 | 0 | 0 | 20 | 50 | 30 | 2 | 2 | 0.1 | 1130 | 52 | 2000 |
| 64 | 3 | 65 | 32 | 0.5 | 10 | 50 | 20 | 20 | 0 | 0 | 20 | 50 | 30 | 2 | 2 | 0.1 | 1130 | 50 | 3000 |
| 65 | 3 | 80 | 17 | 0.5 | 10 | 50 | 20 | 20 | 0 | 0 | 20 | 50 | 30 | 2 | 2 | 0.1 | 1130 | 53 | 2000 |
| 66 | 15 | 80 | 5 | 0.5 | 10 | 50 | 20 | 20 | 0 | 0 | 20 | 50 | 30 | 2 | 2 | 0.1 | 1130 | 59 | 2000 |
| *67 | 3 | 80 | 17 | 0.2 | 0 | 80 | 0 | 20 | 0 | 20 | 30 | 30 | 20 | 3 | 0 | 0 | 1160 | 53 | 700 |
| 68 | 3 | 80 | 17 | 0.21 | 0 | 80 | 0 | 20 | 0 | 20 | 30 | 30 | 20 | 3 | 0 | 0 | 1160 | 51 | 1000 |
| 69 | 3 | 80 | 17 | 0.5 | 0 | 80 | 0 | 20 | 0 | 20 | 30 | 30 | 20 | 3 | 0 | 0 | 1160 | 50 | 2000 |
| 70 | 3 | 80 | 17 | 0.9 | 0 | 80 | 0 | 20 | 0 | 20 | 30 | 30 | 20 | 3 | 0 | 0 | 1160 | 42 | 5000 |
| *71 | 3 | 80 | 17 | 1 | 0 | 80 | 0 | 20 | 0 | 0 | 0 | 0 | 0 | 3 | 0 | 0 | 1160 | 37 | 9000 |
| *72 | 10 | 70 | 20 | 0.6 | 0 | 20 | 0 | 50 | 30 | 0 | 30 | 60 | 10 | 0 | 0 | 0 | 1250 | not sintered. | |
| 73 | 10 | 70 | 20 | 0.6 | 0 | 20 | 0 | 50 | 30 | 0 | 30 | 60 | 10 | 0.1 | 0 | 0 | 1250 | 64 | 3000 |
| 74 | 10 | 70 | 20 | 0.6 | 0 | 20 | 0 | 50 | 30 | 0 | 30 | 60 | 10 | 0.5 | 0 | 0 | 1250 | 65 | 4000 |
| 75 | 10 | 70 | 20 | 0.6 | 0 | 20 | 0 | 50 | 30 | 0 | 30 | 60 | 10 | 1 | 0 | 0 | 1200 | 67 | 5000 |
| 76 | 10 | 70 | 20 | 0.6 | 0 | 20 | 0 | 50 | 30 | 0 | 30 | 60 | 10 | 5 | 0 | 0 | 1170 | 68 | 6000 |
| *77 | 10 | 70 | 20 | 0.6 | 0 | 20 | 0 | 50 | 30 | 0 | 30 | 60 | 10 | 15 | 0 | 0 | 1130 | 64 | 5000 |
| *78 | 10 | 70 | 20 | 0.5 | 0 | 20 | 0 | 50 | 30 | 0 | 30 | 60 | 10 | 20 | 0 | 0 | 1130 | 59 | 900 |
| 79 | 20 | 70 | 10 | 0.3 | 20 | 0 | 0 | 80 | 0 | 40 | 0 | 0 | 60 | 2 | 0 | 0.05 | 1170 | 74 | 6000 |
| 80 | 20 | 70 | 10 | 0.3 | 20 | 0 | 0 | 80 | 0 | 40 | 0 | 0 | 60 | 2 | 2 | 0.05 | 1130 | 75 | 8000 |
| 81 | 20 | 70 | 10 | 0.3 | 20 | 0 | 0 | 80 | 0 | 40 | 0 | 0 | 60 | 2 | 5 | 0.05 | 1090 | 73 | 5000 |
| 82 | 20 | 70 | 10 | 0.3 | 20 | 0 | 0 | 80 | 0 | 40 | 0 | 0 | 60 | 2 | 10 | 0.05 | 1060 | 72 | 4000 |
| *83 | 20 | 70 | 10 | 0.3 | 20 | 0 | 0 | 80 | 0 | 40 | 0 | 0 | 60 | 2 | 13 | 0.05 | 1060 | 72 | 700 |
| 84 | 10 | 70 | 20 | 0.7 | 0 | 60 | 10 | 30 | 0 | 30 | 0 | 70 | 0 | 3 | 2 | 0.1 | 1140 | 56 | 10000 |
| 85 | 10 | 70 | 20 | 0.7 | 0 | 60 | 10 | 30 | 0 | 30 | 0 | 70 | 0 | 3 | 2 | 0.5 | 1140 | 55 | 6000 |
| 86 | 10 | 70 | 20 | 0.7 | 0 | 60 | 10 | 30 | 0 | 30 | 0 | 70 | 0 | 3 | 2 | 1 | 1140 | 54 | 2000 |
| *87 | 10 | 70 | 20 | 0.7 | 0 | 60 | 10 | 30 | 0 | 30 | 0 | 70 | 0 | 3 | 2 | 2 | 1140 | 53 | 500 |
| 88 | 10 | 70 | 20 | 0.4 | 20 | 20 | 0 | 60 | 0 | 10 | 10 | 80 | 0 | 2 | 0.5 | 0.1 | 1160 | 64 | 5000 |
| 89 | 10 | 70 | 20 | 0.4 | 20 | 20 | 0 | 60 | 0 | 10 | 10 | 40 | 40 | 2 | 0.5 | 0.1 | 1160 | 71 | 3000 |
| 90 | 20 | 70 | 10 | 0.3 | 0 | 0 | 0 | 100 | 0 | 0 | 0 | 100 | 0 | 2 | 2 | 0.5 | 1120 | 76 | 2000 |
| 91 | 20 | 70 | 10 | 0.3 | 0 | 0 | 0 | 100 | 0 | 0 | 0 | 0 | 100 | 2 | 2 | 0.5 | 1120 | 87 | 2000 |

Sample Nos. marked with * indicate comparative examples which fall outside the scope of the present invention.

If the Mn content is in excess of about 1 wt. % relative to 100 wt. % of the essential component, the Q value decreases, which is unfavorable.

In Examples 1 and 2, the barium component, the titanium component, the rare earth component, the vanadium component, the copper component and the manganese component were all mixed and fired preliminarily. However, alternatively, the barium component, the titanium component and the rare earth component may be mixed and fired preliminarily, followed by addition of the vanadium component, the copper component and the manganese component thereto. Even in this case, the effects are similar to those in the case of Examples 1 and 2.

Also, the barium, titanium, rare earth, vanadium, copper and manganese components used in Examples 1 and 2 were $BaCO_3$, $TiO_2$, $Re_2O_3$, $V_2O_5$, CuO and $MnCO_3$, respectively, but are not limited thereto. Other compounds, oxalates, hydroxides, alkoxides, and the like may be used.

EXAMPLE 3

Figure 2:
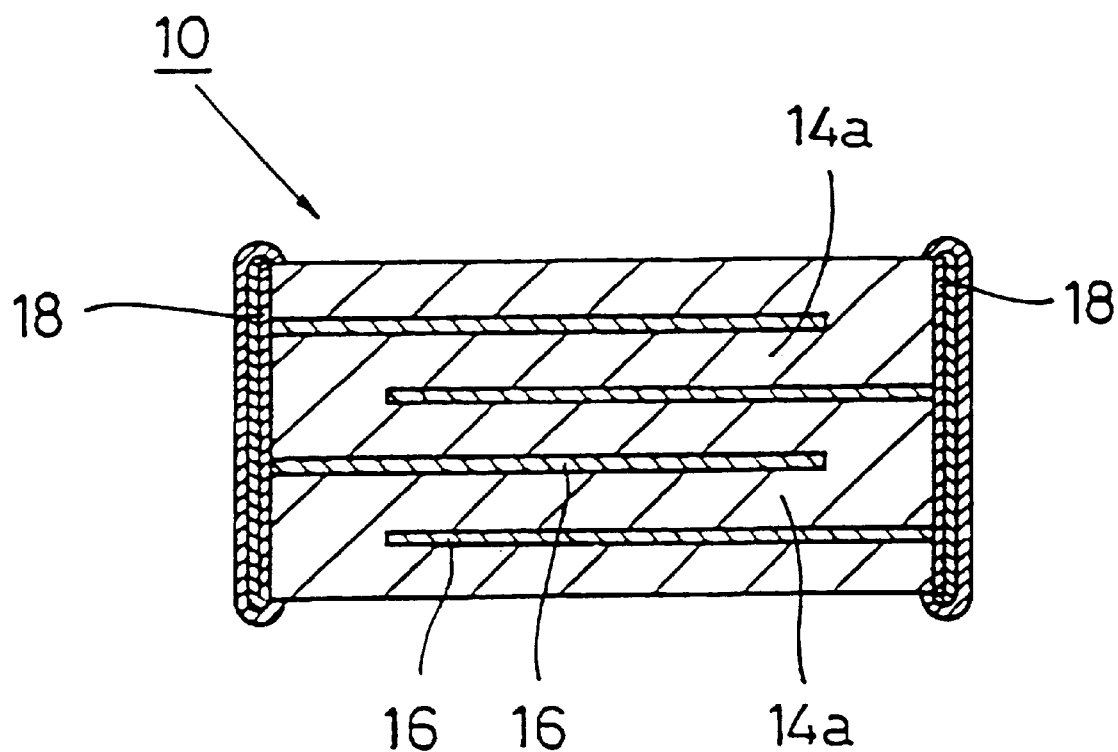
FIG. 2 is a sectional view showing a monolithic ceramic capacitor using a dielectric ceramic composition of the invention.

A monolithic ceramic capacitor 10 shown in FIG. 2 was manufactured according to the following procedure.

Barium carbonate ($BaCO_3$), titanium oxide ($TiO_2$) rare earth oxide ($Re_2O_3$), vanadium oxide ($V_2O_5$), copper oxide (CuO) and manganese carbonate ($MnCO_3$) were weighed so as to prepare dielectric ceramic compositions as shown in Table 1. Each composition was wet-milled with ethanol in a ball mill for 16 hours. The resultant mixture was dried and pulverized, followed by preliminary firing at a temperature of 1000° C. to obtain a preliminary fired powder. An appropriate amount of polyvinyl alcohol solution was added to the powder and mixed. The mixture was sheeted through doctor blading to obtain a ceramic green sheet 14a having a thickness of 50 μm.

Figure 3:
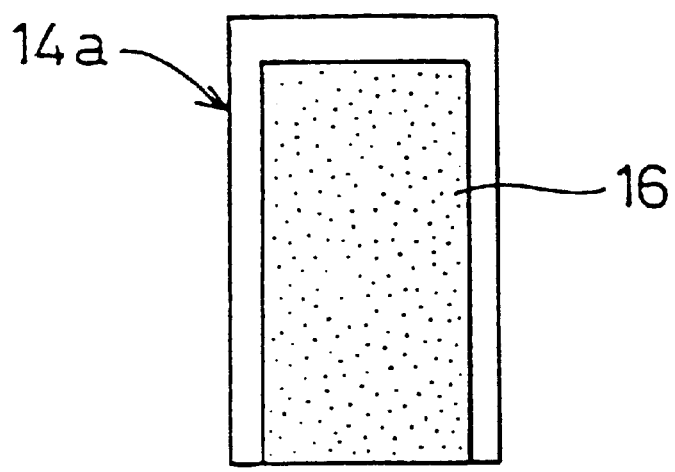
FIG. 3 is a plan view showing a laminate of a ceramic layer and an electrode paste layer formed on the ceramic layer for use in manufacture of the monolithic ceramic capacitor of FIG. 2.
Figure 4:
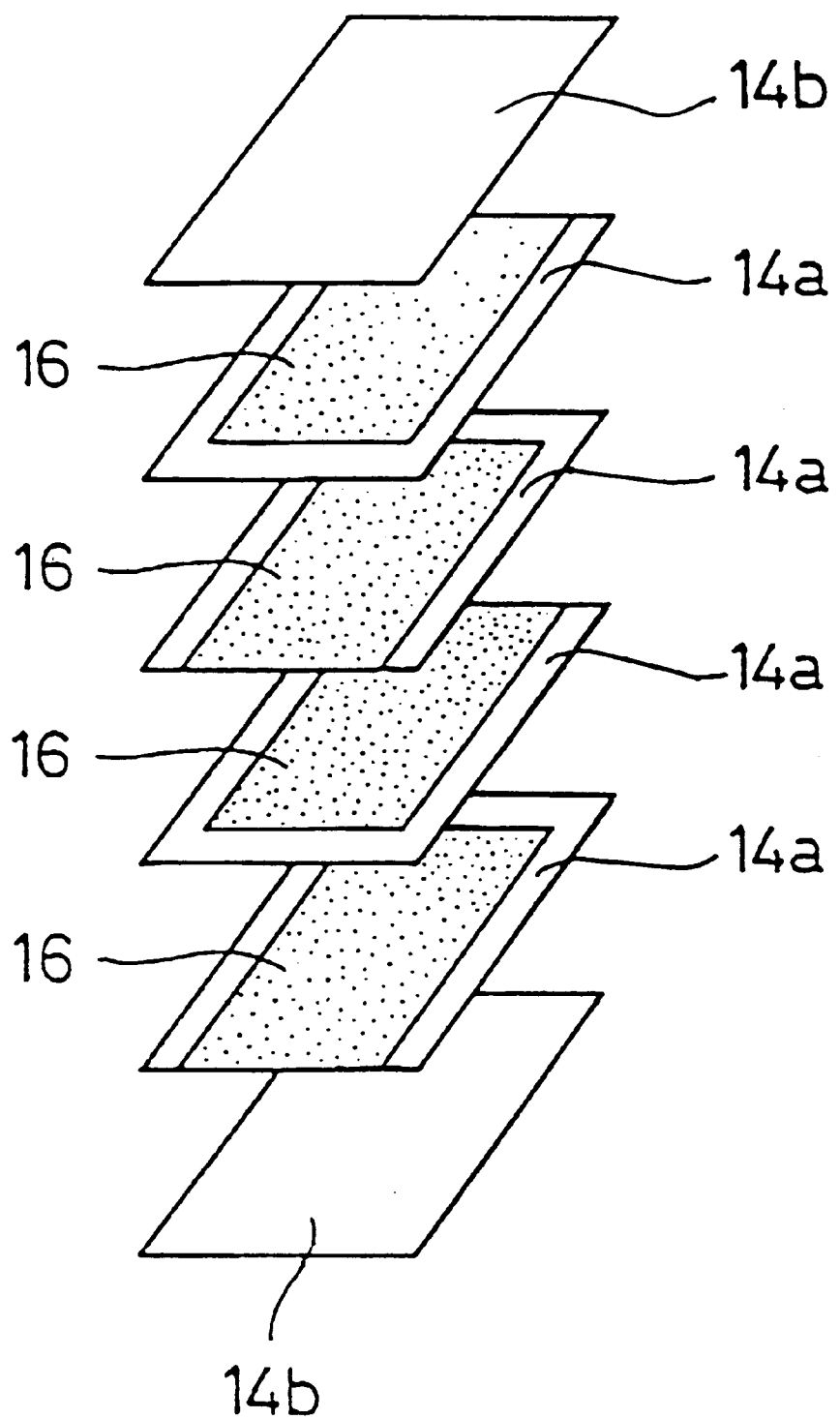
FIG. 4 is a perspective view showing a plurality of the laminates of FIG. 3 for use in manufacture of the monolithic ceramic capacitor of FIG. 2.

Next, an electroconductive paste consisting essentially of Pd-Ag was printed on the ceramic green sheet 14a to form thereon an electroconductive paste layer 16, which serves as an inner electrode. See FIG. 3. As shown in FIG. 4, a plurality of the ceramic green sheets 14a each having the electroconductive paste layer 16 formed thereon were laminated in such a manner that the side of one sheet 14a having the electroconductive paste layer 16 exposed was alternated with that of another sheet 14a having the electroconductive paste layer 16 unexposed. Thus was obtained a laminate as shown in FIG. 2. This laminate was heated at 300° C. in air, whereby the binder was burnt out, and was then fired for 2 hours. Then, external electrodes 18 were applied to the corresponding sides of the laminate to thereby connect the exposed inner electrodes 16.

Also, through use of a dielectric ceramic composition of Example 2, a monolithic ceramic capacitor can be manufactured in a manner similar to that described above.

As described hereinabove, the present invention provides a dielectric ceramic composition having a high specific inductive capacity, ∈r, of not lower than 30 or not lower than 40, and a large Q value of not smaller than 1000 at 1 MHz, and which is capable of being fired at a low temperature of up to 1250° C., i.e., capable of being applied to monolithic ceramic capacitors having inner electrodes made of Ag-Pd.

What is claimed is:

1. A dielectric ceramic composition containing an essential component represented by the following formula:

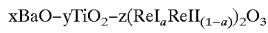

where x, y and z are in mol %; x+y+z=100; (x, y, z) falls within a polygonal region defined by four points of A(39.5, 59.5, 1), B(1, 59.5, 39.5), C(1, 85, 14) and D(14, 85, 1); $0.2 < a \leq 1.0$; ReI is at least one rare earth element selected from the group consisting of Tb, Dy, Ho, Er and Yb; and ReII is at least one rare earth element selected from the group consisting of La, Pr, Nd and Sm, and further containing V as a side component in an amount, α, of about 0.1 wt. % to 15 wt. % in terms of $V_2O_5$ relative to 100 wt. % of the essential component.

2. A dielectric ceramic composition as claimed in claim 1, wherein a is 1.

3. The dielectric ceramic composition as claimed in claim 2, which contains Cu as a side component in an amount, β, of not greater than about 10 wt. % in terms of CuO relative to 100 wt. % of the essential component.

4. The dielectric ceramic composition as claimed in claim 2, which contains Mn as a side component in an amount, γ, of not greater than about 1 wt. % in terms of MnO relative to 100 wt. % of the essential component.

5. The dielectric ceramic composition as claimed in claim 4, which contains Cu as a side component in an amount, β, of not greater than about 10 wt. % in terms of CuO relative to 100 wt. % of the essential component.

6. The dielectric ceramic composition as claimed in claim 5, wherein α is between about 2 and about 4, β is between about 2 and about 4, and γ is not greater than about 0.05.

7. The dielectric ceramic composition as claimed in claim 6, wherein (x, y, z) is about (10, 70, 20) and ReI is at least one of Ho and Er.

8. A dielectric ceramic composition as claimed in claim 1, wherein a is less than 1.

9. The dielectric ceramic composition as claimed in claim 8, which contains Cu as a side component in an amount, β, of not greater than about 10 wt. % in terms of CuO relative to 100 wt. % of the essential component.

10. The dielectric ceramic composition as claimed in claim 8, which contains Mn as a side component in an amount, γ, of not greater than about 1 wt. % in terms of MnO relative to 100 wt. % of the essential component.

11. The dielectric ceramic composition as claimed in claim 10, which contains Cu as a side component in an amount, β, of not greater than about 10 wt. % in terms of CuO relative to 100 wt. % of the essential component.

12. The dielectric ceramic composition as claimed in claim 11, wherein α is between about 2 and about 4, β is between about 2 and about 4, and γ is not greater than about 0.05.

13. A monolithic ceramic capacitor comprising:
   a ceramic layer;
   a plurality of inner electrodes which are embedded inside the ceramic layer, each of the electrodes being disposed so as to be apart from one another in the ceramic layer; and
   outer electrodes on outer surfaces of the ceramic layer electrically conducted to the inner electrodes;
wherein
   the ceramic layer is of a dielectric ceramic composition according to claim 1.

14. The monolithic ceramic capacitor as claimed in claim 13, wherein the inner electrodes are Pd-Ag.

15. A monolithic ceramic capacitor comprising:
   a ceramic layer;
   a plurality of inner electrodes which are embedded inside the ceramic layer, each of the electrodes being disposed so as to be apart from one another in the ceramic layer; and
   outer electrodes on outer surfaces of the ceramic layer electrically conducted to the inner electrodes;

wherein
  the ceramic layer is of a dielectric ceramic composition according to claim 2.

16. The monolithic ceramic capacitor as claimed in claim 15, wherein the inner electrodes are Pd-Ag.

17. A monolithic ceramic capacitor comprising:

a ceramic layer;

a plurality of inner electrodes which are embedded inside the ceramic layer, each of the electrodes being disposed so as to be apart from one another in the ceramic layer; and outer electrodes on outer surfaces of the ceramic layer electrically conducted to the inner electrodes;

wherein
  the ceramic layer is of a dielectric ceramic composition according to claim 6.

18. A monolithic ceramic capacitor comprising:

a ceramic layer;

a plurality of inner electrodes which are embedded inside the ceramic layer, each of the electrodes being disposed so as to be apart from one another in the ceramic layer; and outer electrodes on outer surfaces of the ceramic layer electrically conducted to the inner electrodes;

wherein
  the ceramic layer is of a dielectric ceramic composition according to claim 8.

19. The monolithic ceramic capacitor as claimed in claim 18, wherein the inner electrodes are Pd-Ag.

20. A monolithic ceramic capacitor comprising:

a ceramic layer;

a plurality of inner electrodes which are embedded inside the ceramic layer, each of the electrodes being disposed so as to be apart from one another in the ceramic layer; and outer electrodes on outer surfaces of the ceramic layer electrically conducted to the inner electrodes;

wherein
  the ceramic layer is of a dielectric ceramic composition according to claim 11.

* * * * *